United States Patent
Kobayashi et al.

(10) Patent No.: US 11,153,493 B2
(45) Date of Patent: Oct. 19, 2021

(54) CONTROL APPARATUS, IMAGING APPARATUS, AND STORAGE MEDIUM FOR ADJUSTING A FOCAL PLANE

(71) Applicant: CANON KABUSHIKI KAISHA, Tokyo (JP)

(72) Inventors: Yoshikuni Kobayashi, Azumino (JP); Etsuya Takami, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/692,308

(22) Filed: Nov. 22, 2019

(65) Prior Publication Data

US 2020/0177820 A1    Jun. 4, 2020

(30) Foreign Application Priority Data

Nov. 29, 2018  (JP) .............................. JP2018-223051

(51) Int. Cl.
*H04N 5/232* (2006.01)
*H04N 5/262* (2006.01)

(52) U.S. Cl.
CPC ..... *H04N 5/23299* (2018.08); *H04N 5/23212* (2013.01); *H04N 5/2621* (2013.01)

(58) Field of Classification Search
None
See application file for complete search history.

(56) References Cited

U.S. PATENT DOCUMENTS

| | | | |
|---|---|---|---|
| 2009/0015670 A1* | 1/2009 | Gopinath | ......... G08B 13/19686 348/143 |
| 2012/0098965 A1 | 4/2012 | Barcala | |
| 2012/0169902 A1* | 7/2012 | Matsuzawa | .......... H04N 5/2254 348/239 |
| 2013/0082985 A1* | 4/2013 | Sasakura | .................. G09B 5/06 345/204 |
| 2017/0272658 A1* | 9/2017 | Ito | .......................... G03B 13/02 |
| 2020/0128162 A1 | 4/2020 | Takami | |

FOREIGN PATENT DOCUMENTS

| | | |
|---|---|---|
| CN | 103092001 A | 5/2013 |
| CN | 107454309 A | 12/2017 |
| JP | H05-53166 A | 3/1993 |
| JP | H0783661 A | 3/1995 |

OTHER PUBLICATIONS

Extended European Search Report dated Apr. 28, 2020 by the European Patent Office in corresponding European Patent Application No. 19212036.8.

(Continued)

*Primary Examiner* — Edemio Navas, Jr.
(74) *Attorney, Agent, or Firm* — Carter, DeLuca & Farrell LLP

(57) ABSTRACT

A control apparatus includes an angle control unit configured to change an angle between an imaging plane of an image sensor and a plane orthogonal to an optical axis of an imaging lens, an acquisition unit configured to acquire positional information of a specific area of an image, and a management unit configured to change the positional information based on the angle.

7 Claims, 7 Drawing Sheets

(56) References Cited

OTHER PUBLICATIONS

Zhong et al. "Design and Simulation of CMOS Star Sensor Lens with Large Relative Aperture and Wide Field" 2011 International Conference on Electronic & Mechanical Engineering and Information Technology, Aug. 12-14, 2011, pp. 3194-3197.

Junhong et al. "Feedback Efficiency for Diode Laser Wavelength Stabilization System," May 2015, translated abstract, p. 4.

Notification of First Office Action issued by the China National Intellectual Property Administration dated Jun. 24, 2021 in corresponding CN Patent Application No. 201911191701.7, with English translation.

* cited by examiner

CONTROL APPARATUS, IMAGING APPARATUS, AND STORAGE MEDIUM FOR ADJUSTING A FOCAL PLANE

BACKGROUND OF THE INVENTION

Field of the Invention

The present invention relates to a control apparatus that can adjust a focal plane, an imaging apparatus having the same, and a program (or storage medium).

Description of the Related Art

A network camera may not be able to obtain a deep depth of field in a scene such as a long house, corridor, and parking lot depending on lens performance, and imaging condition such as an angle of view and an F-number. For example, in imaging a road, a passerby, and a car from a network camera installed on the ceiling in a deep scene, there may be part of the imaging area that is in focus. Conventionally, there has been known a method of adjusting a focal plane by tilting an imaging plane relative to an imaging optical axis plane orthogonal to the optical axis, and focusing from the front to the back in the above scene. Japanese Patent Application Laid-Open No. ("JP") 5-53166 discloses a camera in which an image sensor inclines to an imaging optical axis plane orthogonal to the optical axis.

Some network cameras have a privacy mask function that hides a specified area from the viewpoint of privacy protection, a detection function that detects a moving object and taking away by analyzing the image, or an area data reduction function that makes different a compression ratio for each image area. When the technique disclosed in Japanese Patent Laid-Open No. 5-53166 is applied to a network camera having such a function, an image is captured by tilting the imaging plane due to a difference in focal length above and below the imaging plane, or the influence of an optical filter. It is distorted into a trapezoidal shape or the image position moves. As a result, before and after the imaging plane is tilted, there is a shift between a coordinate in the captured image and the captured image.

SUMMARY OF THE INVENTION

The present invention provides a control apparatus, an imaging apparatus, a storage medium (program), each of which can effectively use a privacy mask function, a detection function, or an area data reduction function without requiring resetting of a target position by a user even if an angle of an imaging plane is changed.

A control apparatus according to one aspect of the present invention includes an angle control unit configured to change an angle between an imaging plane of an image sensor and a plane orthogonal to an optical axis of an imaging lens, an acquisition unit configured to acquire positional information of a specific area of an image, and a management unit configured to change the positional information based on the angle. An imaging apparatus including the above control apparatus constitutes another aspect of the present invention. A non-transitory computer-readable storage medium storing a program configured to cause a computer to execute a control method corresponding above control apparatus also constitutes another aspect of the present invention.

Further features of the present invention will become apparent from the following description of exemplary embodiments with reference to the attached drawings.

DESCRIPTION OF THE EMBODIMENTS

Figure 1:
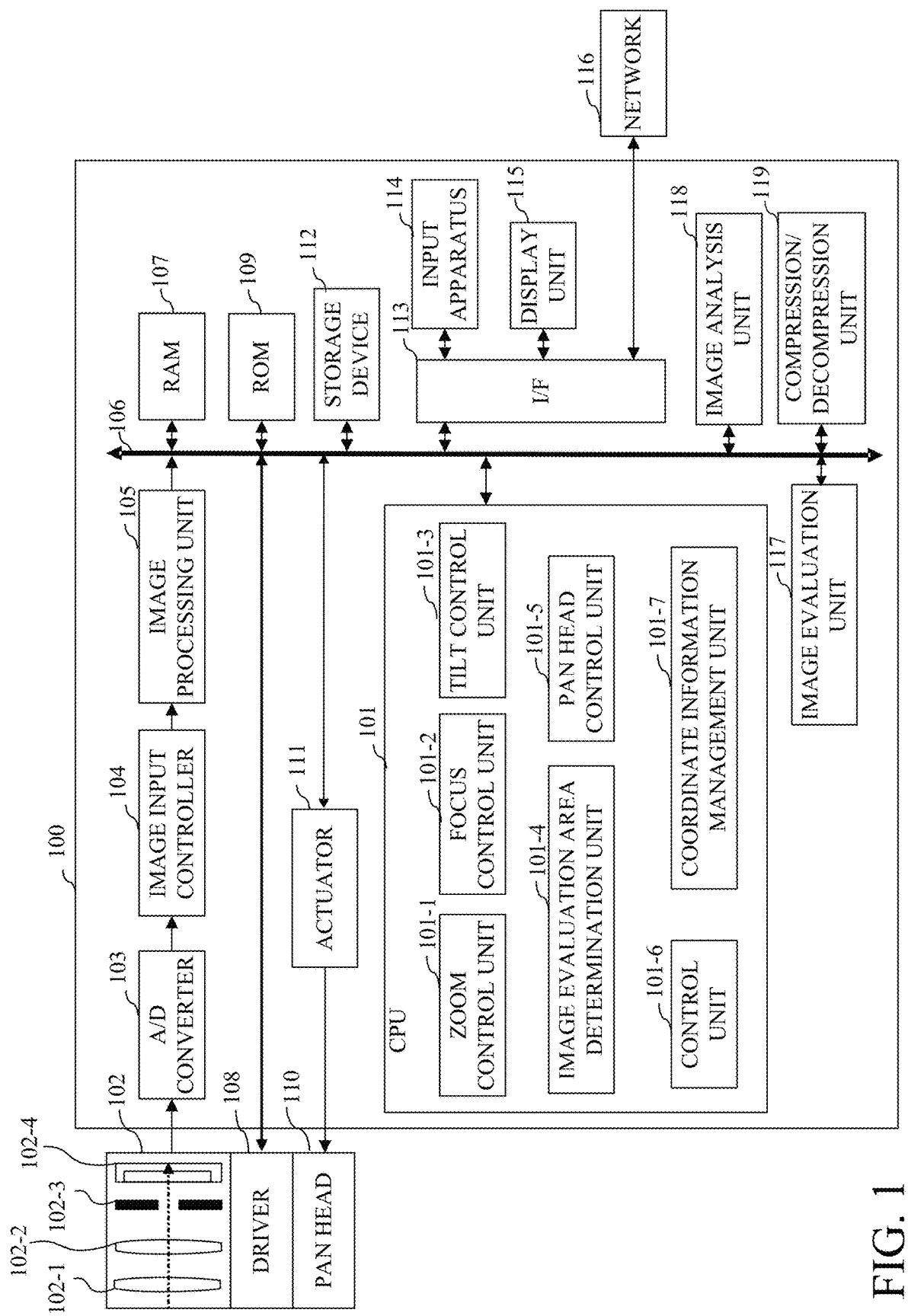
FIG. 1 illustrates a configuration of an imaging apparatus according to one embodiment of the present invention.

Referring now to the accompanying drawings, a detailed description will be given of embodiments according to the present invention. Corresponding elements in respective figures will be designated by the same reference numerals, and a description thereof will be omitted.

The present invention is applicable to an apparatus and means for controlling a device having a function of capturing a motion image. The device having a function of capturing the motion image includes, for example, an imaging apparatus, such as a network camera, a video camera, and a still camera, a mobile phone having an imaging function, and a portable information terminal. This embodiment will discuss the imaging apparatus, such as the network camera, to which the present invention is applied.

Overall Structure

FIG. 1 illustrates a configuration of an imaging apparatus 100 according to one embodiment of the present invention. A CPU 101 includes a zoom control unit 101-1, a focus control unit 101-2, a tilt control unit 101-3, an image evaluation area determination unit 101-4, a pan head control unit 101-5, a control unit 101-6, and a coordinate information management unit 101-7, and governs an overall control of the imaging apparatus 100. In this embodiment, the imaging apparatus 100 is controlled by the CPU 101 provided therein, but the present invention is not limited to this embodiment. The imaging apparatus 100 may be controlled from the outside by a control apparatus having a function of the CPU 101, which is separate from the imaging apparatus 100.

An imaging unit 102 includes an imaging optical system and an image sensor 102-4. The imaging optical system includes a zoom lens 102-1, a focus lens 102-2, and a diaphragm (aperture stop) 102-3. The image sensor 102-4 includes an image sensor or the like, and generates an image by photoelectrically converting an optical image formed via the imaging optical system.

The zoom control unit 101-1 moves the zoom lens 102-1 along the optical axis via a driver 108. The focus control unit 101-2 moves the focus lens 102-2 along the optical axis via the driver 108. The control unit 101-6 operates the diaphragm 102-3 via the driver 108. The tilt control unit (angle control unit) 101-3 controls a tilt angle of the image sensor 102-4 via the driver 108 so as to tilt the imaging plane relative to the imaging optical axis plane orthogonal to the optical axis.

The pan head control unit 101-5 controls a movement of a pan head 110 via the actuator 111, and rotates the imaging unit 102 in the horizontal direction and the vertical direction. Thereby, an image can be captured while the imaging direction is changed. The pan head 110 includes a pan driver and a tilt driver. The pan driver can rotate in the lateral direction from −175° to +175°, and rotates the imaging unit 102 in the horizontal direction. The tilt driver can rotate from 0° or the horizontal direction to 90° or the upright direction, and rotates the imaging unit 102 in the vertical direction.

The image sensor 102-4 photoelectrically converts light that has passed the imaging optical system and generates an analog image signal. The generated analog image signal undergoes amplification processing by sampling processing, such as correlated double sampling, and then input into an A/D converter 103. An parameter used for the amplification processing is controlled by the CPU 101. The A/D converter 103 converts the amplified analog image signal into a digital image signal, and outputs the digital image signal to an image input controller 104. The image input controller 104 receives the digital image signal and outputs it to an image processing unit 105.

The image processing unit 105 performs various digital image processing for the digital image signal based on sensitivity information during imaging output from the image sensor 102-4, such as an AGC gain and an ISO speed, and then passes through a bus 106, and stored in a RAM 107. Various digital image processing includes, for example, offset processing, gamma correction processing, gain processing, RGB interpolation processing, noise reduction processing, contour correction processing, color tone correction processing, and light source type determination processing.

The image processing unit 105 performs OSD processing for superimposing character information on an image, and masking processing for concealing a masking area (private mask area) through a mask image superimposition and mosaic/blur processing. The coordinate information (positional information) of the masking area is set by the user operation from an input unit 114 or a network 116 and stored in the coordinate information management unit (or acquisition unit) 101-7. The coordinate information management unit 101-7 updates the coordinate information of the masking area based on the stored coordinate information and the tilt angle of the image sensor 102-4 acquired from the tilt control unit 101-3, and notifies the image processing unit 105 of it.

The RAM 107 includes a volatile memory such as an SRAM and a DRAM. The ROM 109 includes a nonvolatile memory such as an EEPROM and a flash memory. A storage device 112 includes a storage device such as an HDD, SSD, or eMMC. A program for realizing the function according to this embodiment and data used when the program is executed are stored in the ROM 109 or the storage device 112. The program and data are properly installed in the RAM 107 via the bus 106 under control of the CPU 101 and used by the CPU 101.

An I/F 113 includes a variety of I/Fs relating to an input and an output. The I/F 113 is connected to the input unit 114 such as an operation key including a release switch and a power switch, a cross key, a joystick, a touch panel, a keyboard, and a pointing device (such as a mouse), and notifies the CPU 101 of instruction information. The I/F 113 is connected to a display unit 115 such as an LCD display, and displays an image and operation menu information temporarily recorded in the RAM 107. The I/F 113 is connected to the network 116 via a LAN.

An image evaluation unit 117 calculates an evaluation value of a designated area of the image in accordance with the control instruction from the image evaluation area determination unit 101-4. More specifically, the image evaluation unit 117 acquires an image from the RAM 107, and calculates an evaluation value relating to the contrast of the specific frequency based on the luminance value of the designated area.

An image analysis unit 118 performs an image analysis such as a face detection, a person detection, a moving object detection, a passage detection, a congestion detection, a trajectory detection, and a leaving/taking away detection. The image analysis result is notified to the CPU 101. The coordinate information (positional information) of an image analysis area that is a target of the image analysis is set by the user operation through the input unit 114 or the network 116 and stored in the coordinate information management unit 101-7. The coordinate information management unit 101-7 updates the coordinate information of the image analysis area based on the stored coordinate information and the tilt angle of the image sensor 102-4 acquired from the tilt control unit 101-3, and notifies the image analysis unit 118 of it. In this embodiment, the image analysis area includes not only an area having a predetermined area but also an image analysis line composed of one or more lines.

The compression/decompression unit (CODEC) 119 performs compression processing for an image according to a control instruction from the CPU 101 and generates compressed data. The compressed data is output to the display unit 115 and the network 116 via the I/F 113. In addition, the CODEC 119 performs decompression processing of a predetermined format for the compressed data stored in the storage device 112 and generates decompressed data. More specifically, the compression processing conforming to the JPEG standard is performed for a still image, and the compression/decompression processing conforming to a standard such as MOTION-JPEG, MPEG2, AVC/H. 264 and AVC/H. 265 is performed for a motion image. The CODEC 119 can designate the compression rate of the designated area (compression rate designated area). The coordinate information (positional information) and the compression rate of the compression rate designated area set by the user operation from the input unit 114 or the network 116 are held in the coordinate information management unit 101-7. The coordinate information management unit 101-7 updates the coordinate information of the compression rate designated area based on the held coordinate and the tilt angle of the image sensor 102-4 acquired from the tilt control unit 101-3, and together with the compression rate, and notifies the CODEC 119 of the coordinate information and the compression rate.

Figure 2A:
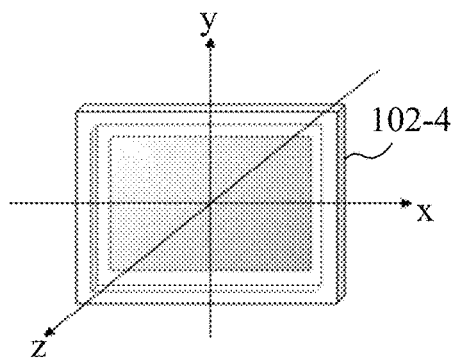
FIGS. 2A to 2F schematically illustrate a tilt and a focal plane of an image sensor.
Figure 2B:
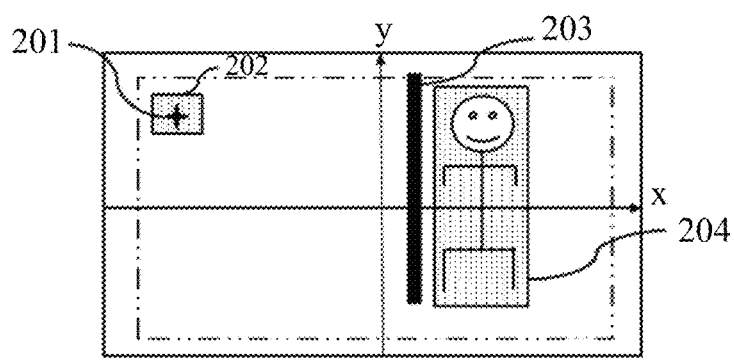
Figure 2C:
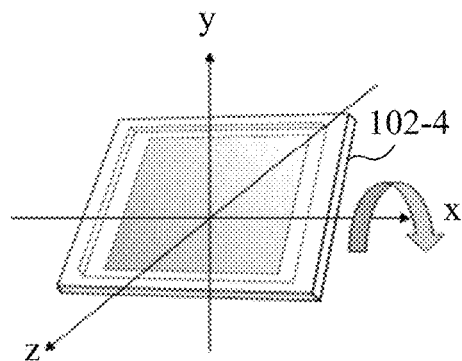
Figure 2D:
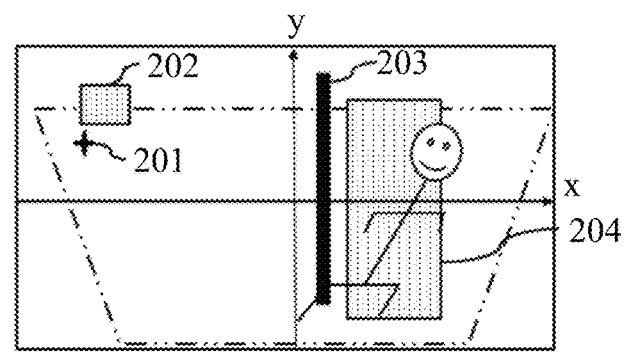
Figure 2E:
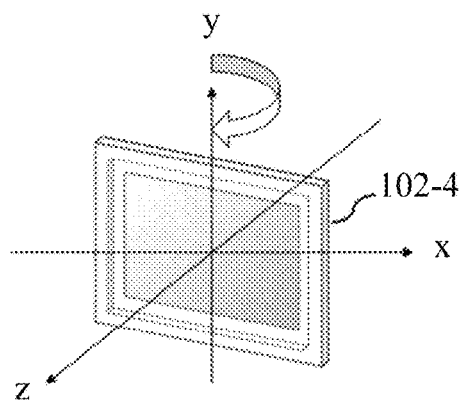
Figure 2F:
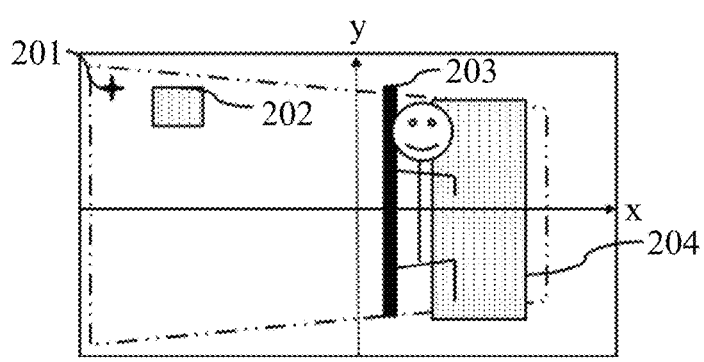

A description will now be given of an image when the image sensor 102-4 is tilted and an image is captured after the masking area, the image analysis line, and the compression rate designated area are set. FIGS. 2A to 2F schematically show the tilt and focal plane of the image sensor. FIGS. 2A, 2C, and 2E show states of the image sensor 102-4. FIG. 2B shows an image captured without tilting the image sensor 102-4 as illustrated in FIG. 2A. FIG. 2D shows an image captured by tilting the image sensor 102-4 in the tilt direction, as illustrated in FIG. 2C. FIG. 2F shows an image captured by tilting the image sensor 102-4 in the pan direction, as illustrated in FIG. 2E.

As illustrated in FIG. 2B, a masking area 202 is set by the image processing unit 105 so as to conceal an object 201. An image analysis line 203 and a compression rate designated area 204 are set. In this embodiment, the image analysis line 203 is set as the target of the image analysis, but the image analysis area may be set by a plurality of vertices.

When the image sensor 102-4 is tilted, the position of the object 201 in the image changes from the position before the image sensor 102-4 is tilted, as illustrated in FIGS. 2D and 2F. However, since the position of the masking area 202 is maintained, the object 201 is not concealed. The positional relationship between the image analysis line 203 and the compression rate designated area 204 relative to the image also changes from the positional relationship before the image sensor 102-4 is tilted.

Figure 3B:
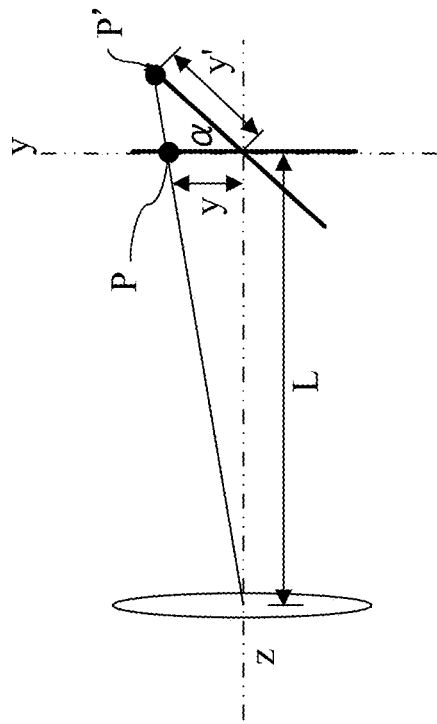
FIGS. 3A to 3C schematically illustrate a trapezoidal distortion due to the tilt of the image sensor.
Figure 3C:
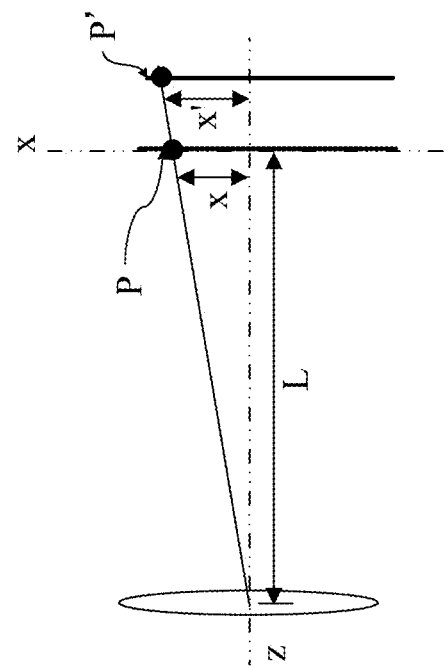
Figure 3A:
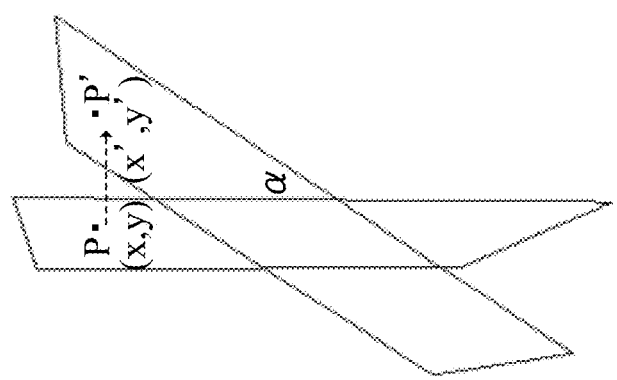

A description will now be given of a cause of the above change that occurs when the image sensor 102-4 is tilted. FIGS. 3A to 3C schematically illustrate a trapezoidal distortion caused by the tilt of the image sensor 102-4. FIG. 3A shows the imaging plane tilted by an angle α. FIGS. 3B and 3C show imaging planes on the yz plane and the xz plane, respectively. An arbitrary position P on the imaging plane before the image sensor 102-4 is tilted is projected onto a projection position P' on the imaging plane after the image sensor 102-4 is tilted by the angle α. Where L is an (on-axis) distance from the lens to the image sensor 102-4 before it is tilted by the angle α, an x coordinate x' and a y coordinate y' of the projection position P' can be expressed by using an x coordinate x and a y coordinate y of the position P, the projection transformation, and the following expressions (1) and (2).

$$x' = \frac{x(L + y'\sin\alpha)}{L} \quad (1)$$

$$y' = \frac{Ly}{L\cos\alpha - y\sin\alpha} \quad (2)$$

As represented by the expressions (1) and (2), tilting the image sensor 102-4 causes a trapezoidal distortion in the image.

Figure 4:
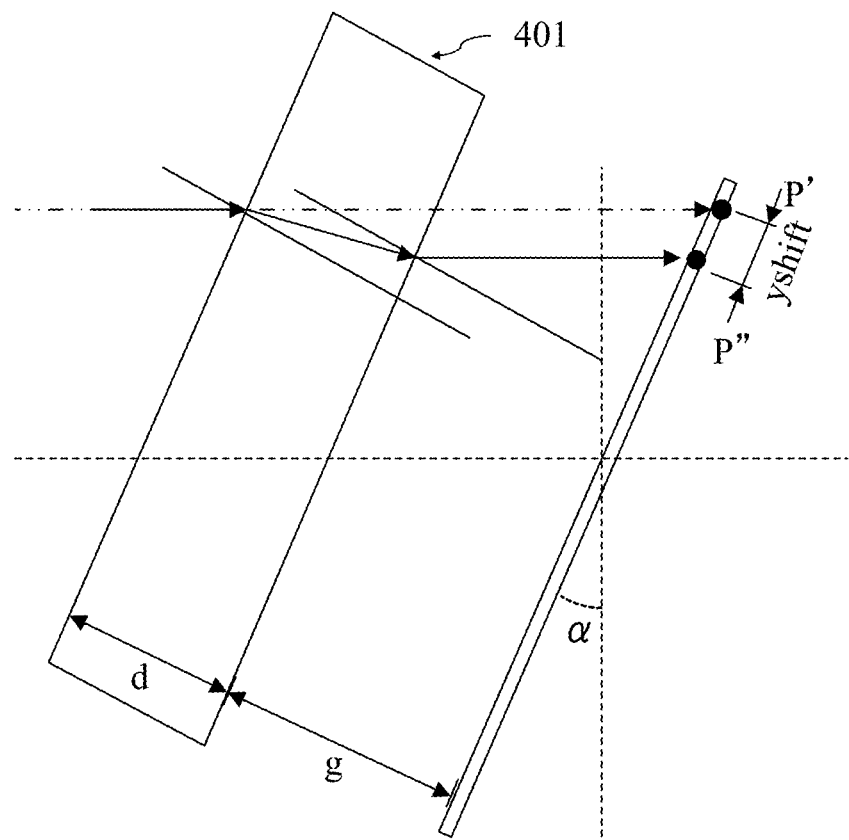
FIG. 4 schematically illustrates a movement of an image due to an inclination of an image sensor.

FIG. 4 schematically illustrates an image movement caused by the tilt of the image sensor 102-4. An optical filter 401 is attached to the image sensor 102-4 in order to reduce the image degradation and moire due to the infrared ray. When the image sensor 102-4 and the optical filter 401 are tilted, the projection position P' of the arbitrary position P on the imaging plane before the image sensor 102-4 is tilted changes to a projection position P''' due to the refraction influence of the optical filter 401. Where d is a thickness of the optical filter 401, n is a refractive index, and g is a (minimum) distance between the image sensor 102-4 and the optical filter 401, a change amount y'$_{shift}$ of the projection position is expressed by the following expression (3).

$$y'_{shift} = g\tan\alpha + d\frac{\sin\alpha}{\sqrt{n - \sin^2\alpha}} \quad (3)$$

Therefore, when the image sensor 102-4 is tilted in the tilt direction, the arbitrary position P on the imaging plane before the image sensor 102-4 is tilted is projected onto a projection position P'''. An x coordinate x'' and y coordinate y'' of the projection position P''' are expressed by the following expressions (4) and (5) using the x coordinate x and the y coordinate y of the position P, respectively.

$$x'' = x\left(1 + \left(\frac{y\sin\alpha}{L\cos\alpha - y\sin\alpha}\right)\right) \quad (4)$$

$$y'' = g\tan\alpha + d\frac{\sin\alpha}{\sqrt{n - \sin^2\alpha}} + \frac{Ly}{L\cos\alpha - y\sin\alpha} \quad (5)$$

This embodiment controls the focal plane by tilting the image sensor 102-4, but the present invention is not limited to this embodiment. The focal plane may be controlled by tilting an unillustrated tilt lens provided in the imaging optical system via the driver 108 and the tilt control unit 101-3.

Example 1

Figure 5:
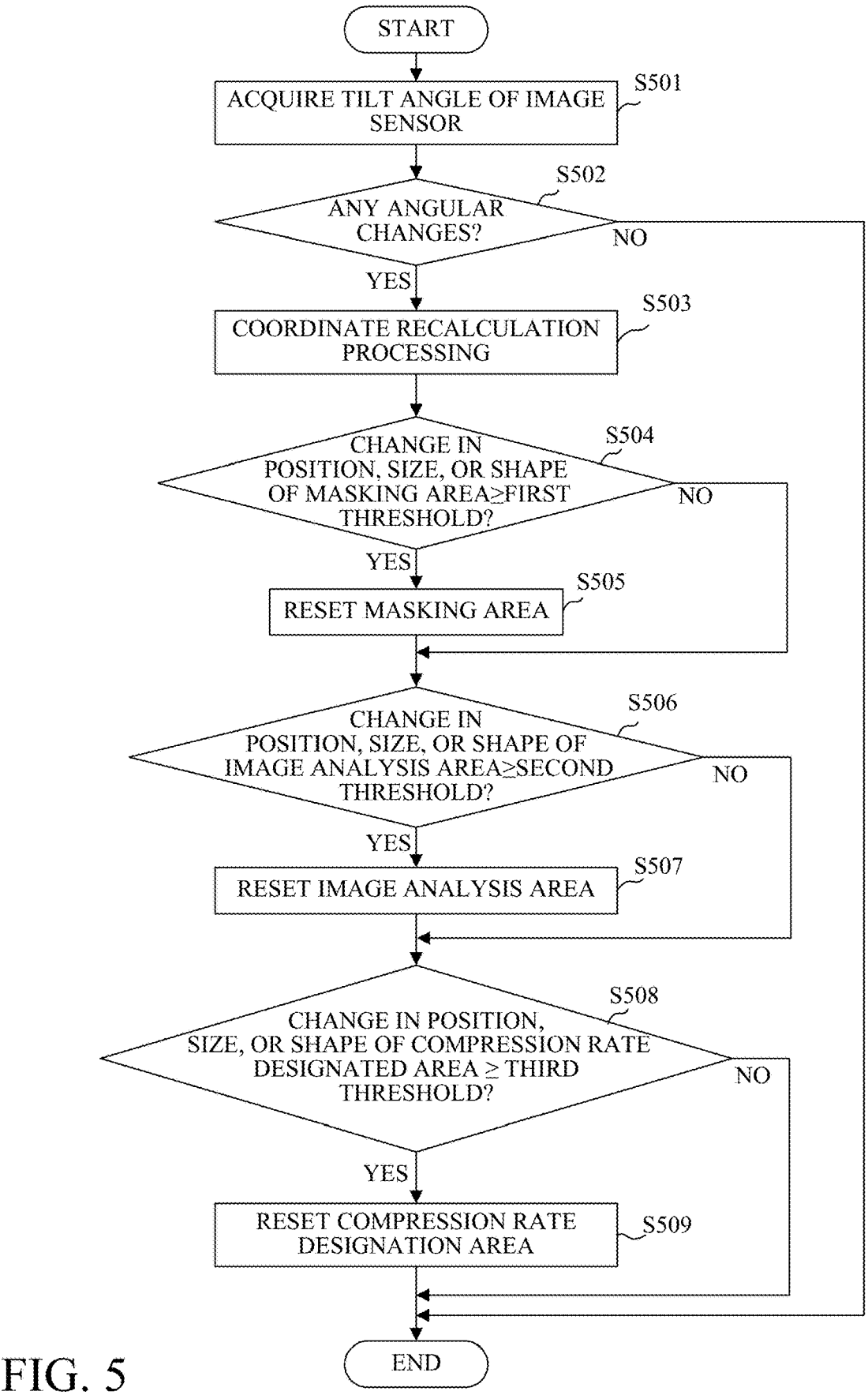
FIG. 5 is a flowchart illustrating coordinate correction processing according to Example 1.

Referring now to FIG. 5, a description will be given of coordinate correction processing according to this example executed for a specific area in an image (at least one of the masking area, the image analysis area, and the compression rate designated area) when the image sensor 102-4 is tilted in the tilt direction. The coordinate correction processing is part of processing in the program stored in the ROM 109. FIG. 5 is a flowchart showing the coordinate correction processing of this example. The coordinate correction processing according to this example is developed in the RAM 107 during the operation of the imaging apparatus 100, and executed by the CPU 101 at the timing at which the image sensor 102-4 captures an image, or the timing at which the tilt control unit 101-3 controls the tilt of the image sensor 102-4.

In the step S501, the CPU 101 acquires the tilt angle of the image sensor 102-4 from the tilt control unit 101-3.

In the step S502, the CPU 101 determines whether or not the tilt angle of the image sensor 102-4 has changed. More specifically, the CPU 101 determines whether the tilt angle of the image sensor 102-4 acquired in the last coordinate correction processing recorded in the RAM 107 is different from the tilt angle of the image sensor 102-4 acquired in the step S501. If the tilt angle of the image sensor 102-4 has changed, the flow proceeds to the step S503. If the tilt angle of the image sensor 102-4 has not changed, the coordinate correction processing ends.

In the step S503, the coordinate information management unit 101-7 performs coordinate recalculation processing for all the specific areas held. The specific area includes an image analysis line.

Figure 6:
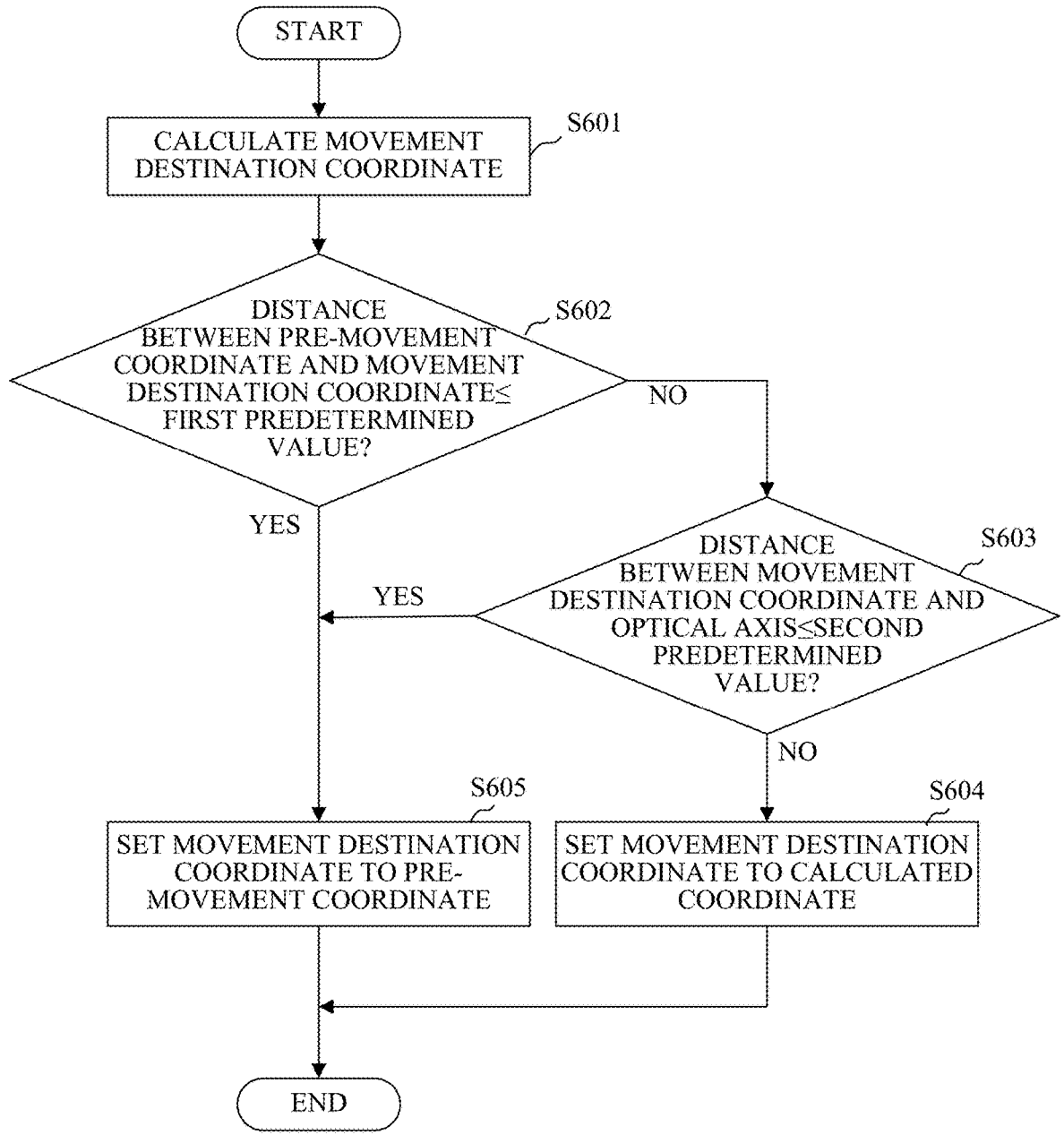
FIG. 6 is a flowchart illustrating coordinate recalculation processing according to Example 1.

Referring now to FIG. 6, a description will be given of coordinate recalculation processing. FIG. 6 is a flowchart showing the coordinate recalculation processing according to this example.

In the step S601, the coordinate information management unit 101-7 calculates a coordinate of a movement destination ("destination coordinate" hereinafter) for each vertex constituting all specific areas that are stored. In this example, the coordinate information management unit 101-7 calculates the destination coordinate based on the refraction influence of the optical filter 401. In other words, where (x, y) is a pre-movement coordinate, a is a tilt angle of the image sensor 102-4, d is a thickness of the optical filter 401, and g is a (minimum) distance between the image sensor 102-4 and the optical filter 401, a coordinate (x'', y'') of the movement destination is expressed by the following expressions (6) and (7)

$$x'' = x \quad (6)$$

$$y'' = g\tan\alpha + d\frac{\sin\alpha}{\sqrt{n - \sin^2\alpha}} \quad (7)$$

This example calculates the destination coordinate based on the refraction influence of the optical filter 401, but the present invention is not limited to this example. The destination coordinate may be calculated based on another factor that affects the optical spatial axis, such as a trapezoidal distortion due to the angle between the imaging plane and the optical axis, the image distortion due to the lens aberration, or the orientation of the pan head 110.

In the step S602, the coordinate information management unit 101-7 determines whether the distance between the pre-movement coordinate (x, y) and the destination coordinate (x", y") is equal to or less than a first predetermined value. The first predetermined value is determined as the maximum size that does not affect each function based on the pixel size of the input/output image in the image processing unit 105, the pixel size of the analysis image in the image analysis unit 118, or the compression block size in the CODEC 119. The first predetermined value can also be set from the input unit 114 or the network 116 through the I/F 113. If the calculated distance is equal to or less than the first predetermined value, the flow proceeds to the step S605, and if it is greater than the first predetermined value, the flow proceeds to the step S603. When the calculated distance is equal to the first predetermined value, which step to proceed to may be arbitrarily set.

In the step S603, the coordinate information management unit 101-7 determines whether the distance from the destination coordinate (x", y") to the optical axis is equal to or less than a second predetermined value. The second predetermined value is determined as the maximum size that does not affect each function based on the tilt angle of the image sensor 102-4, the pixel size of the input/output image in the image processing unit 105, the pixel size of the analysis image in the image analysis unit 118, or the compression block size in the CODEC 119. The second predetermined value can also be set from the input unit 114 or the network 116 through the I/F 113. When the calculated distance is equal to or less than the second predetermined value, the flow proceeds to the step S605, and when it is greater than the second predetermined value, the flow proceeds to the step S604. When the calculated distance is equal to the second predetermined value, which step to proceed to can be arbitrarily set.

In the step S604, the coordinate information management unit 101-7 sets the destination coordinate to the result calculated in the step S602 or the destination coordinate (x", y").

In the step S605, the coordinate information management unit 101-7 sets the destination coordinate to the pre-movement coordinate (x, y).

The coordinate recalculation processing is executed for the vertices constituting all the specific areas stored by the coordinate information management unit 101-7. After the processing is performed for all the vertices (after the coordinate recalculation processing ends), the flow proceeds to the step S504.

In the step S504, the coordinate information management unit 101-7 determines whether a change in position, size, or shape of all stored masking areas is equal to or greater than a first threshold value. The first threshold value can be determined as the maximum size with which the tilt angle of the image sensor 102-4 does not affect the masking area, based on the pixel size of the input/output image in the image processing unit 105. The first threshold value can also be set from the input unit 114 or the network 116 through the I/F 113. If the change in position, size, or shape of the masking area is equal to or greater than the first threshold value, the flow proceeds to the step S505. If the change is less than the first threshold value, the flow proceeds to the step S506. When the change in position, size, or shape of the masking area is equal to the first threshold, which step to proceed to can be arbitrarily set.

In the step S505, the coordinate information management unit 101-7 notifies the image processing unit 105 of the coordinate information of the masking area in order to reset the masking area.

The processing of the steps S504 and S505 is executed for all masking areas. After the above processing is executed for all masking areas, the flow proceeds to the step S506.

In the step S506, the coordinate information management unit 101-7 determines whether a change in position, size, or shape of all stored image analysis areas is equal to or greater than a second threshold value. The second threshold value can be determined as the maximum size with which the tilt angle of the image sensor 102-4 does not affect the image analysis area, based on the resolution of the analysis image in the image analysis unit 118. The second threshold value can also be set from the input unit 114 or the network 116 through the I/F 113. If the change in position, size, or shape of the image analysis area is equal to or greater than the second threshold value, the flow proceeds to the step S507. If the change is less than the second threshold value, the flow proceeds to the step S508. When the change in position, size, or shape of the image analysis area is equal to the second threshold value, which step to proceed to can be arbitrarily set. The image analysis area further includes an image analysis line.

In the step S507, the coordinate information management unit 101-7 notifies the image analysis unit 118 of the coordinate information of the image analysis area in order to reset the image analysis area.

The processing in the steps S506 and S507 is executed for all image analysis areas. After the above processing is executed for all image analysis areas, the flow proceeds to the step S508.

In the step S508, the CPU 101 determines whether or not a change in position, size, or shape of all the compression rate designated areas stored in the coordinate information management unit 101-7 are equal to or greater than a third threshold value. The third threshold value can be determined as the maximum size with which the tilt angle of the image sensor 102-4 does not affect the compression rate designated area, based on the compression block size in the CODEC 119. The third threshold value can also be set from the input unit 114 or the network 116 through the I/F 113. If the change in position, size, or shape of the compression rate designated area is equal to or greater than the third threshold value, the flow proceeds to the step S509. If the change is less than the third threshold value, the coordinate correction processing ends. When the change in position, size, or shape of the compression rate designated area is equal to the third threshold value, which step to proceed to can be arbitrarily set.

In the step S509, the coordinate information management unit 101-7 notifies the CODEC 119 of the coordinate information of the compression rate designated area in order to reset the compression rate designated area.

The processing of the steps S508 and S509 is executed for all compression rate designated areas. After the above processing is executed for all the compression rate designated areas, the coordinate correction processing ends.

Figure 7A:
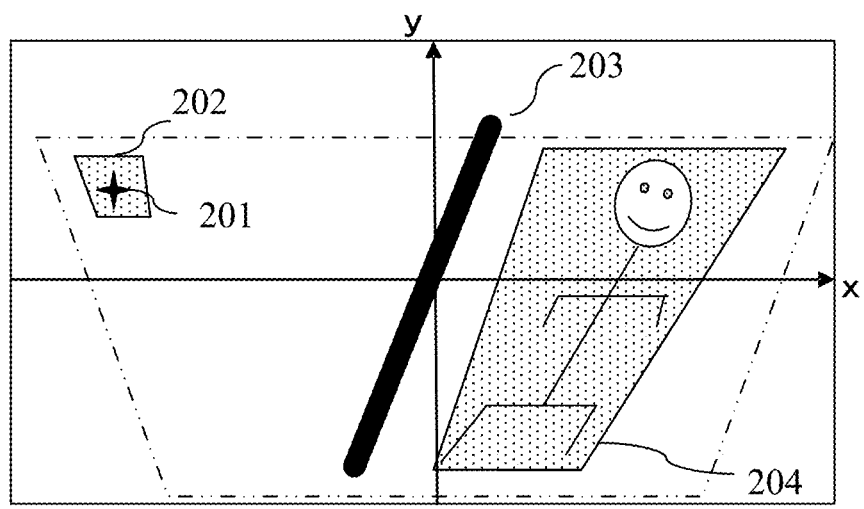
FIGS. 7A and 7B show images after the coordinate correction processing of Example 1 is applied.
Figure 7B:
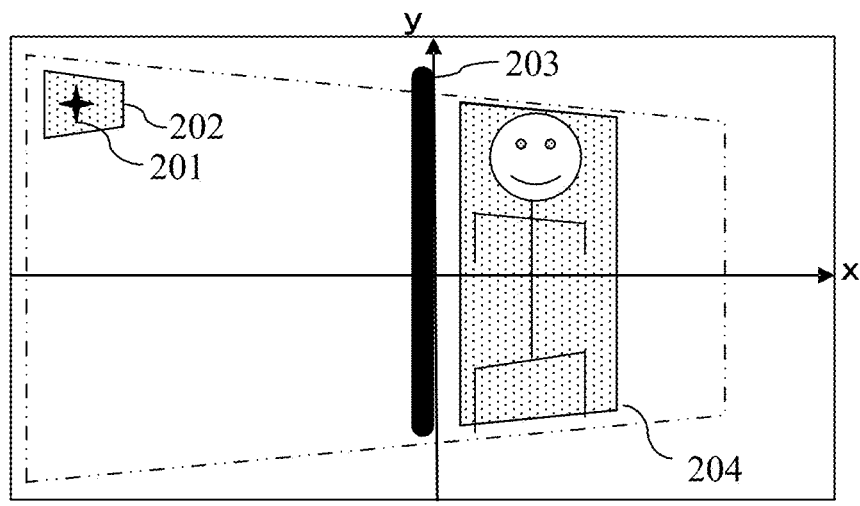

FIGS. 7A and 7B illustrate an image after the coordinate correction processing is performed for the specific area in the image captured by tilting the image sensor 102-4. FIG. 7A illustrates an image after the coordinate correction processing is performed for the image in FIG. 2D. FIG. 7B shows an image after the coordinate correction processing is performed for the image in FIG. 2F. As illustrated in FIGS. 7A and 7B, the masking area 202 conceals the object 201. The positional relationship of the image analysis line 203 and the compression rate designated area 204 relative to the image also maintains the positional relationship before the image sensor 102-4 is tilted.

As described above, even when the image distortion or the angle of view is changed by tilting the image sensor 102-4, this embodiment makes the specific area of the image follow the position intended during user setting.

While this embodiment has described the coordinate correction processing when the image sensor 102-4 is tilted in the tilt direction, the coordinate correction processing according to this example is applicable when the image sensor 102-4 is tilted in the pan direction. By so doing, the above effects of the present invention can be obtained.

Example 2

Example 1 calculates the destination coordinate in the step S601 of the coordinate recalculation processing, based on the refraction influence of the optical filter 401, whereas this example calculates the destination coordinate based on the influence of a trapezoid distortion depending on the angle between the imaging plane and the optical axis. Since other configurations and methods are the same as those of Example 1, a detailed description thereof will be omitted in this example.

In the step S601, the coordinate information management unit 101-7 calculates the destination coordinate based on the influence of the trapezoidal distortion due to the angle between the imaging plane and the optical axis. In other words, where (x, y) is a pre-movement coordinate, a is a tilt angle of the image sensor 102-4, and L is a (minimum) distance between the image sensor 102-4 and the lens, a coordinate (x", y") of the movement destination is expressed by the following expressions (8) and (9).

$$x'' = x\left(1 + \left(\frac{y\sin\alpha}{L\cos\alpha - y\sin\alpha}\right)\right) \quad (8)$$

$$y'' = \frac{Ly}{L\cos\alpha - y\sin\alpha} \quad (9)$$

Similar to Example 1, even when the image distortion or the angle of view is changed by tilting the image sensor 102-4, this example can make the specific area of the image follow the position intended during the user setting.

Example 3

This example calculates the destination coordinate based on the refraction influence of the optical filter 401 and the influence of the trapezoidal distortion due to the angle between the imaging plane and the optical axis, in the step S601 of the coordinate recalculation processing. Since other configurations and methods are the same as those in the Example 1, a detailed description thereof will be omitted in this example.

In the step S601, the coordinate information management unit 101-7 calculates the destination coordinate based on the refraction influence of the optical filter 401 and the influence of the trapezoidal distortion due to the angle between the imaging plane and the optical axis. In other words, where (x, y) is a pre-movement coordinate, a is a tilt angle of the image sensor 102-4, d is a thickness of the optical filter 401, g is a (minimum) distance between the image sensor 102-4 and the optical filter 401, and L is an (on-axial) distance between the image sensor 102-4 and the lens, the destination coordinate (x", y") is expressed by the following expressions (10) and (11).

$$x'' = x\left(1 + \left(\frac{y\sin\alpha}{L\cos\alpha - y\sin\alpha}\right)\right) \quad (10)$$

$$y'' = g\tan\alpha + d\frac{\sin\alpha}{\sqrt{n - \sin^2\alpha}} + \frac{Ly}{L\cos\alpha - y\sin\alpha} \quad (11)$$

Similar to Example 1, even if the image distortion or the angle of view is changed by tilting the image sensor 102-4, this example can make the specific area of the image follow the position intended during the user setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-223051, filed on Nov. 29, 2018, which is hereby incorporated by reference herein in its entirety.

What is claimed is:

1. A control apparatus comprising:
a hardware processor; and
a memory for storing instructions to be executed by the hardware processor, wherein, when the instructions stored in the memory are executed by the hardware processor, the control apparatus functions as:
an angle control unit configured to tilt an image sensor relative to a plane orthogonal to an optical axis of an imaging lens so that an angle between an imaging plane of the image sensor and the plane orthogonal to the optical axis of the imaging lens is changed;
an acquisition unit configured to acquire positional information of a specific area in an image, the specific area being specified by a user on the image before the angle is changed, the specific area being an area for an object to be concealed;
a determining unit configured to determine a new position of the specific area in the image after the image sensor is tilted based on the angle and the positional information so that the object is concealed after the image sensor is tilted; and
a changing unit configured to change a position of the specific area in the image to the new position of the specific area in the image based on a result of the determination determined by the determining unit.

2. The control apparatus according to claim 1, wherein the changing unit changes the new position of the specific area based on a tilting of the angle when a distance from the position to an optical axis of the imaging lens is larger than a predetermined value, and the changing unit does not change the new position of the specific area based on the tilting of the angle when the distance is smaller than the predetermined value.

3. The control apparatus according to claim 1, wherein after the image sensor is tilted, the determining unit determines the new position of the specific area in the image.

4. The control apparatus according to claim 1, further comprising a management unit configured to store the positional information.

5. An imaging apparatus comprising a control apparatus, wherein the control apparatus includes:
a hardware processor; and
a memory for storing instructions to be executed by the hardware processor, wherein, when the instructions stored in the memory are executed by the hardware processor, the imaging apparatus functions as:
an angle control unit configured to tilt an image sensor relative to a plane orthogonal to an optical axis of an imaging lens so that an angle between an imaging plane of the image sensor and the plane orthogonal to the optical axis of the imaging lens is changed;
an acquisition unit configured to acquire positional information of a specific area in an image, the specific area being specified by a user on the image before the angle is changed, the specific area being an area for an object to be concealed; and
a determining unit configured to determine a new position of the specific area in the image after the image sensor is tilted based on the angle and the positional information so that the object is concealed after the image sensor is tilted; and
a changing unit configured to change a position of the specific area in the image to the new position of the specific area in the image based on a result of the determination determined by the determining unit.

6. A non-transitory computer-readable storage medium storing a program for causing a computer to execute a control method, wherein the control method includes:
tiling an image sensor relative to a plane orthogonal to an optical axis of an imaging lens so that an angle between an imaging plane of the image sensor and the plane orthogonal to the optical axis of the imaging lens is changed;
acquiring positional information of a specific area in an image, the specific area being specified by a user on the image before the angle is changed, the specific area being an area for an object to be concealed;
determining a new position of the specific area in the image after the image sensor is tilted based on the angle and the positional information so that the object is concealed after the image sensor is tilted; and
changing a position of the specific area in the image to the new position of the specific area in the image based on a result of the determination.

7. A control method comprising:
tiling an image sensor relative to a plane orthogonal to an optical axis of an imaging lens so that an angle between an imaging plane of the image sensor and the plane orthogonal to the optical axis of the imaging lens is changed;
acquiring positional information of a specific area in an image, the specific area being specified by a user on the image before the angle is changed, the specific area being an area for an object to be concealed;
determining a new position of the specific area in the image after the image sensor is tilted based on the angle and the positional information so that the object is concealed after the image is tilted; and
changing a position of the specific area in the image to the new position of the specific area in the image based on a result of the determination.

* * * * *